(12) United States Patent
Khafagy et al.

(10) Patent No.: US 10,266,178 B2
(45) Date of Patent: Apr. 23, 2019

(54) AUTOMATIC ENGINE START-STOP CONTROL DURING DRIVER EXIT EVENTS

(71) Applicant: FORD GLOBAL TECHNOLOGIES, LLC, Dearborn, MI (US)

(72) Inventors: Hafiz Shafeek Khafagy, Dearborn, MI (US); Eric Michael Rademacher, Royal Oak, MI (US); Ahmed Awadi, Farmington Hills, MI (US); Hank L. Kwong, Farmington Hills, MI (US); Giuseppe Domenico Suffredini, Shelby Township, MI (US)

(73) Assignee: FORD GLOBAL TECHNOLOGIES, LLC, Dearborn, MI (US)

( * ) Notice: Subject to any disclaimer, the term of this patent is extended or adjusted under 35 U.S.C. 154(b) by 202 days.

(21) Appl. No.: 15/292,471

(22) Filed: Oct. 13, 2016

(65) Prior Publication Data

US 2018/0105178 A1 Apr. 19, 2018

(51) Int. Cl.

| | |
|---|---|
| *B60W 30/18* | (2012.01) |
| *B60W 10/06* | (2006.01) |
| *B60W 10/18* | (2012.01) |
| *F02D 41/04* | (2006.01) |
| *F02D 41/06* | (2006.01) |
| *F02N 11/08* | (2006.01) |

(52) U.S. Cl.
CPC ...... *B60W 30/18054* (2013.01); *B60W 10/06* (2013.01); *B60W 10/182* (2013.01); *F02D 41/042* (2013.01); *F02D 41/065* (2013.01); *F02N 11/0814* (2013.01); *F02N 11/0822* (2013.01); *B60W 2520/10* (2013.01); *B60W 2540/10* (2013.01); *B60W 2710/186* (2013.01); *F02D 2200/602* (2013.01); *F02N 2200/0801* (2013.01); *F02N 2200/106* (2013.01); *F02N 2300/2011* (2013.01); *Y02T 10/48* (2013.01)

(58) Field of Classification Search
CPC ............................................... B60W 30/18054
See application file for complete search history.

(56) References Cited

U.S. PATENT DOCUMENTS

| | | | |
|---|---|---|---|
| 7,890,243 B2 * | 2/2011 | Abendroth | .......... F02N 11/0818 123/179.3 |
| 8,280,608 B2 | 10/2012 | Senda et al. | |
| 9,062,618 B2 | 6/2015 | Rademacher et al. | |
| 2007/0267238 A1* | 11/2007 | Guy | ....................... B60K 28/04 180/272 |
| 2016/0023660 A1 | 1/2016 | Yu | |
| 2016/0032995 A1 | 2/2016 | Nishino et al. | |

\* cited by examiner

*Primary Examiner* — Derek D Knight
(74) *Attorney, Agent, or Firm* — David B. Kelley; Brooks Kushman P.C.

(57) ABSTRACT

A vehicle includes an engine and a controller programmed to autostop and autostart the engine. The controller is further programmed to, in response to receiving signals indicative of a driver exiting the vehicle while the engine is auto stopped, autostart the engine, and after expiration of a predetermined duration, autostop the engine and inhibit vehicle propulsion until an ignition cycle is initiated.

18 Claims, 3 Drawing Sheets

AUTOMATIC ENGINE START-STOP CONTROL DURING DRIVER EXIT EVENTS

TECHNICAL FIELD

This application is generally related to autostarting and autostopping an engine during driver exit and re-entry events.

BACKGROUND

A vehicle may include a hybrid powertrain that allows for starting and stopping of an engine. The vehicle typically includes a parking brake that is configured to, upon a specific command from the driver, apply a braking force to prevent vehicle motion. The parking brake may be an electric parking brake that is actuated electrically.

SUMMARY

A vehicle includes an engine and a controller programmed to autostop and autostart the engine, and in response to receiving signals indicative of a driver exiting the vehicle while the engine is autostopped, autostart the engine, and after expiration of a predetermined duration, autostop the engine and inhibit vehicle propulsion until an ignition cycle is initiated.

A method of controlling a vehicle includes autostopping, by a controller, an engine in response to a brake pedal travel exceeding a predetermined threshold. The method further includes autostarting, by the controller, the engine in response to receiving signals indicative of a driver exiting the vehicle while the engine is autostopped. The method further includes autostopping, by the controller, the engine after expiration of a predetermined duration. The method further includes inhibiting, by the controller, autostarting the engine until an ignition cycle is initiated.

A powertrain control system for a vehicle includes a controller programmed to autostop and autostart an engine. The controller is further programmed to command activation of an electric park brake during engine autostops when a speed of the vehicle is less than a predetermined speed. The controller is further programmed to, in response to receiving signals indicative of a driver exiting the vehicle while the engine is autostopped, autostart the engine for a predetermined duration.

DETAILED DESCRIPTION

Embodiments of the present disclosure are described herein. It is to be understood, however, that the disclosed embodiments are merely examples and other embodiments can take various and alternative forms. The figures are not necessarily to scale; some features could be exaggerated or minimized to show details of particular components. Therefore, specific structural and functional details disclosed herein are not to be interpreted as limiting, but merely as a representative basis for teaching one skilled in the art to variously employ the present invention. As those of ordinary skill in the art will understand, various features illustrated and described with reference to any one of the figures can be combined with features illustrated in one or more other figures to produce embodiments that are not explicitly illustrated or described. The combinations of features illustrated provide representative embodiments for typical applications. Various combinations and modifications of the features consistent with the teachings of this disclosure, however, could be desired for particular applications or implementations.

Figure 1:
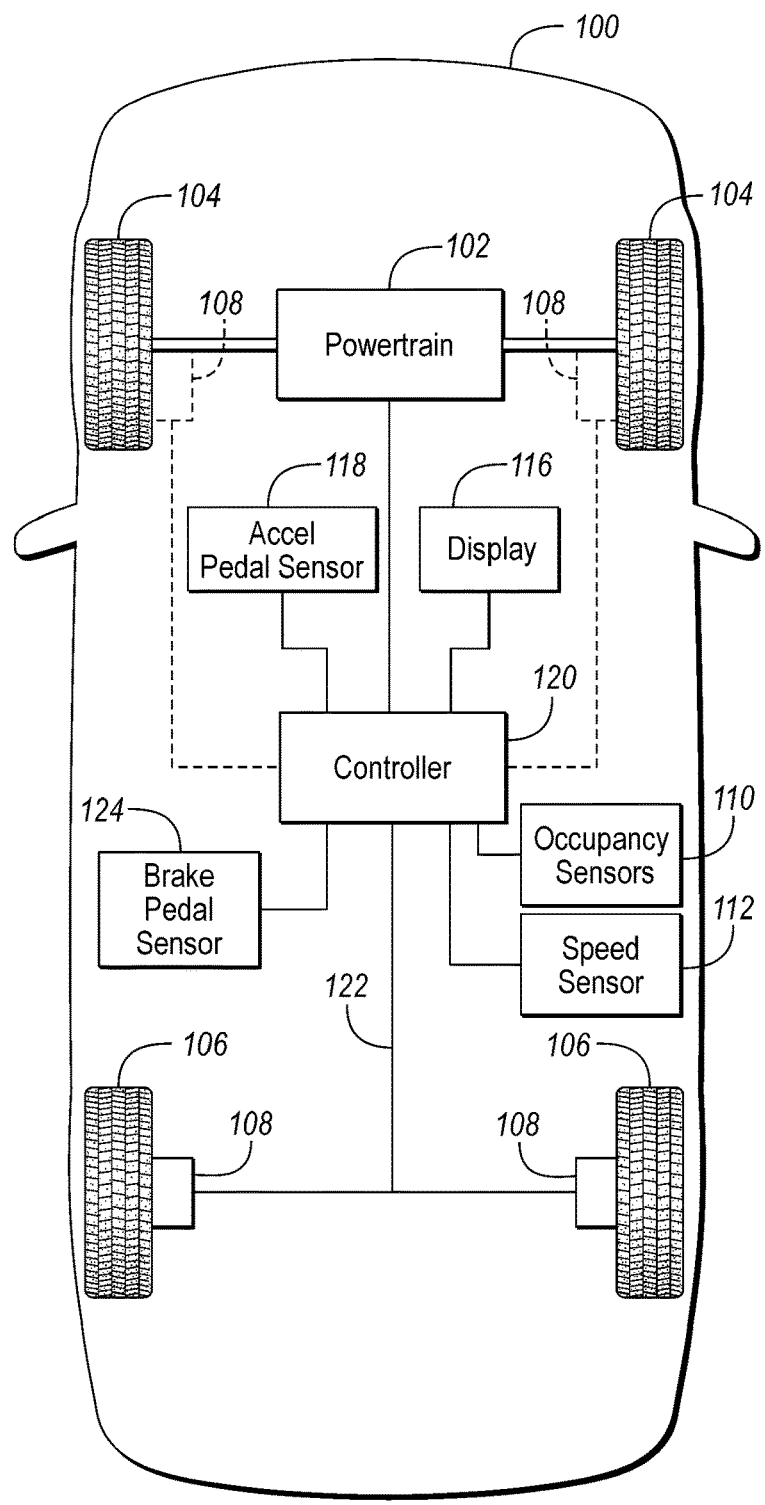
FIG. 1 is a block diagram of a possible vehicle configuration.

FIG. 1 depicts a block diagram of a vehicle 100. The vehicle 100 may include a powertrain 102 configured to provide propulsive torque to one or more drive wheels 104. The vehicle 100 may incorporate any of a variety of powertrain configurations. The powertrain 102 may include an internal combustion engine (ICE) or a diesel engine. The powertrain 102 may include one or more electric machines. In some powertrain configurations, the electric machine may be configured to rotate the engine for starting purposes. In some powertrain configurations, the electric machine may be configured to provide propulsive torque to the drive wheels 104. In a hybrid powertrain, the electric machine may be configured to provide propulsive torque and start the engine. The vehicle 100 may include one or more non-driven wheels 106. The powertrain components (e.g., engine, transmission, electric machines, power electronics modules, traction battery) may each include a controller configured to control and monitor the associated powertrain component. The powertrain 102 may be configured as a front-wheel drive (FWD), rear-wheel drive (RWD), or all-wheel drive (AWD) system.

Figure 3:
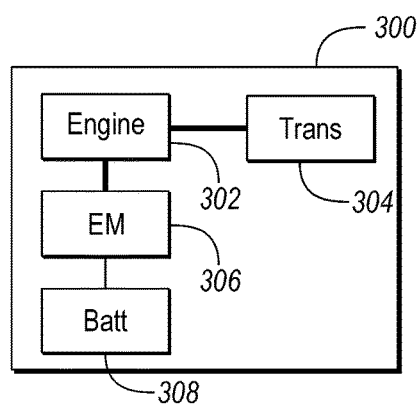
FIG. 3 is a diagram of a vehicle having a powertrain that includes an engine.

FIG. 3 depicts an example block diagram of a mild-hybrid powertrain 300. The mild-hybrid powertrain 300 may include an engine 302 mechanically coupled to a transmission 304. The transmission 304 may be coupled to the drive wheels 104 to provide propulsive torque. The transmission 304 may be configured to adjust a gear ratio between the engine 302 and the drive wheels 104. The transmission 304 may be an automatic transmission having a fixed number of gears and shifting without driver intervention. The transmission 304 may be a manual transmission with fixed gears and shifting via driver intervention. The transmission 304 may be a continuously variable transmission (CVT) having a variable gear ratio between the engine and the drive wheels. The mild-hybrid powertrain 300 may include a starter/alternator 306 (e.g., electric machine). The starter/alternator 306 may be electrically coupled to a battery 308. The starter/alternator 306 may be configured to rotate a crankshaft of the engine 302 for starting the engine 302 and to generate electrical power for the battery 308. In a conventional powertrain, the starter/alternator may be separate electric machines—a starter and an alternator.

The mild-hybrid powertrain 300 may be configured to perform engine autostop and autostart cycles. When certain autostop conditions are satisfied, the mild-hybrid powertrain 300 may be programmed to autostop the engine 302. For example, an engine autostop may be triggered when a speed of the vehicle is below a threshold while a brake pedal is applied. When certain autostart conditions are satisfied, the mild-hybrid powertrain 300 may be programmed to autostart the engine 302. For example, an engine autostart may be triggered by releasing the brake pedal and applying an accelerator pedal.

Figure 4:
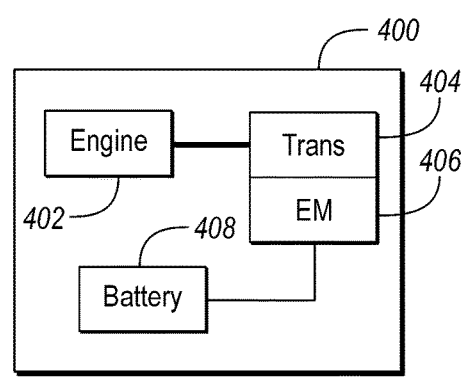
FIG. 4 is a diagram of a vehicle having a hybrid-electric powertrain.

FIG. 4 depicts an example block diagram of a full hybrid-electric (FHEV) powertrain 400. The FHEV powertrain 400 may include an engine 402 mechanically coupled to a hybrid transmission 404. The hybrid transmission 404 may be a power-split hybrid configuration including a planetary gearset and coupled to one or more electric machines 406. The electric machines 406 may be electrically coupled to a traction battery 408.

The FHEV powertrain 400 may also be configured to perform engine autostop and autostart cycles. When certain autostop conditions are satisfied, the FHEV powertrain 400 may be programmed to autostop the engine 402. For example, an engine autostop may be triggered when a speed of the vehicle is below a threshold while a brake pedal is. When certain autostart conditions are satisfied, the FHEV powertrain 400 may be programmed to autostart the engine 402. For example, releasing the brake pedal and applying an accelerator pedal may trigger an engine autostart.

Referring again to FIG. 1, the powertrain 102 may be configured as the mild-hybrid powertrain 300 or the FHEV powertrain 400. During an ignition cycle, the powertrain 102 may be expected to, upon driver request, provide propulsive torque to the drive wheels 104 of the vehicle 100. An ignition cycle may be considered to be a period of time from a key-on event to a key-off event. Alternatively, the ignition cycle may be that period of time in which the vehicle is in a run condition. An ignition cycle may be initiated by the driver by insertion of a key in an ignition and rotating the key until the vehicle is in a run mode. The ignition cycle may be also be initiated by pressing a start button while a key fob is in a proximity of the start button.

The vehicle 100 may include one or more brake modules 108. The brake modules 108 may be configured to apply a torque to the wheels to resist rotation of the wheels. The brake modules 108 may be configured as disc brakes or drum brakes or some combination thereof. The brake modules 108 may incorporate a parking brake function. The parking brake function may include a mechanism that is configured to maintain a brake application at the wheels. The parking brake function may be applied to a subset of all the wheels. In some configurations, the parking brake function may be applied to all of the wheels. In a mechanical parking brake system, the parking brake mechanism may be activated by a cable attached to a lever or pedal in an interior of the vehicle 100. In an electric parking brake (EPB) configuration, the parking brake mechanism may be activated electrically using a motor.

The vehicle 100 may include at least one controller 120. The controller 120 may include a processor for executing instructions. The controller 120 may include volatile and non-volatile memory for storing data and programs. Although depicted as a single module, the controller 120 may include multiple controllers communicating via a vehicle network 122. For example, the vehicle network 122 may be a Controller Area Network (CAN). The vehicle network 122 may also include discrete signals transmitted via conductors between controllers. The controller 120 may be part of a powertrain control system that manages and controls operation of the powertrain 102.

Figure 2:
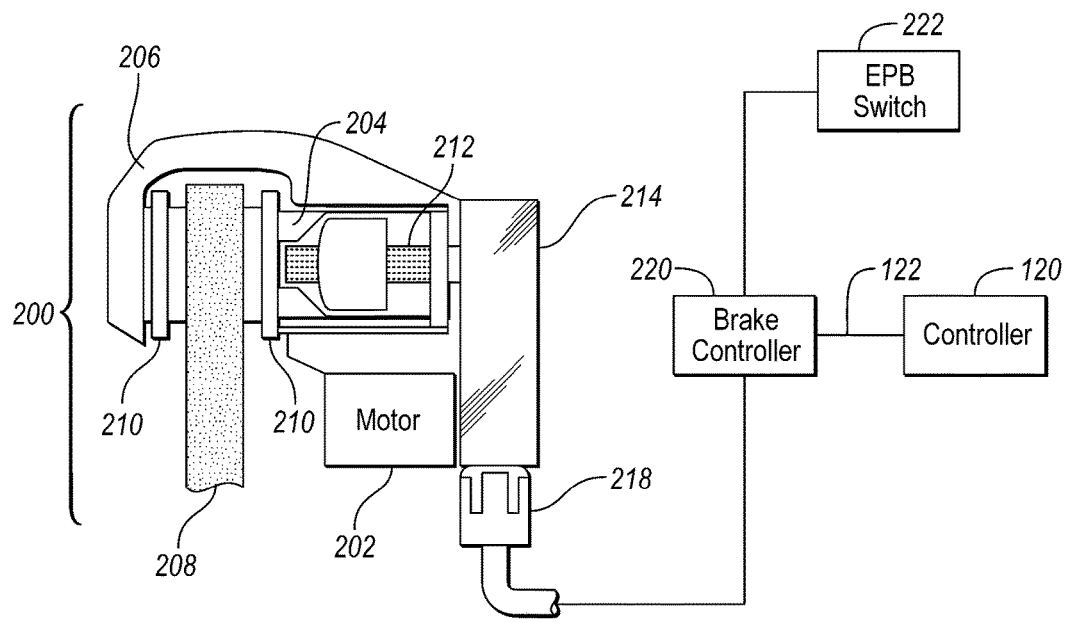
FIG. 2 is a diagram of a possible electric parking brake system.

The brake modules 108 may be configured with an electric parking brake 200 (EPB) feature. FIG. 2 depicts a possible configuration of an electric parking brake (EPB) 200. The EPB 200 may include a motor 202 to actuate a piston 204 and a caliper 206 for disc brakes. A brake system may be a disc-brake system and include a brake rotor 208. Brake pads 210 may be coupled to the calipers 206 on each side of the brake rotor 208 so that the brake rotor 208 can freely move when the caliper 206 is not actuated. The brake piston 204 may be electrically actuated by an EPB motor 202. The EPB motor 202 may be linked to a drive screw 212 through a gear drive 214. The EPB motor 202 and/or gear drive 214 may be electrically linked to a brake controller 220 through an electrical connector 218. The brake controller 220 may be programmed to control a current distribution to the EPB motor 202.

The EPB 200 may be incorporated in each brake module 108 of a selected axle of the vehicle, for example, the non-driven wheels 106. Alternatively, all four wheels may include the EPB 200 or any combination of the drive wheels 104 and non-driven wheels 106 can be fitted with EPB 200.

The EPB 200 may include an EPB switch 222 configured to permit the drive to manually activate and deactivate the EPB system. The EPB switch 222 may be located in proximity to the driver to allow activation and deactivation of the electric parking brake 200. The EPB switch 222 may be electrically coupled to the brake controller 220. The brake controller 220 may include circuitry for receiving the EPB switch signal and may be programmed to determine the status of the EPB switch 222. The brake controller 220 may debounce the signal from the EPB switch 222 to minimize the impact of noise. The EPB switch 222 may be configured to have a plurality of positions. For example, in a first position, the parking brake may be released to allow vehicle movement. In a second position, the parking brake may be applied to prevent vehicle movement. In some configurations, the EPB switch 222 may be a push button. The brake controller 220 may be programmed to toggle the parking brake position in response to a press of the push button. For example, when the vehicle 100 is parked, the driver may depress the EPB switch 222 to activate the EPB 200.

The brake controller 220 may be programmed to actuate the EPB motor 202 in response to an activation of the EPB switch 222 by the driver. Additionally, the brake controller 220 may be programmed to actuate the EPB motor 202 in response to a signal from the controller 120, which may be a powertrain system controller, over the vehicle network 122. When an actuation signal is received via the vehicle network 122, the brake controller 220 may instruct the EPB 200 to actuate and lock the wheels.

Referring again to FIG. 1, the vehicle 100 may include one or more occupancy sensors 110. The occupancy sensors 110 may be configured to detect a presence or absence of a driver and/or passengers within a vehicle interior. For example, the occupancy sensors 110 may include a door sensor that provides a signal indicative of a state of a driver door of the vehicle 100. The state may indicate that the driver door is an open state or a closed state. The door sensor may be a two-terminal switch that is in a closed position when the door is closed and in an open position when the door is open. The controller 120 may apply a voltage to one terminal of the switch and measure the voltage at the other terminal to determine the status of the door. The driver may be predicted to have left the vehicle 100 when the door is detected to be in an open state with the ignition on.

The occupancy sensors 110 may include a weight sensor in a seat of the vehicle 100 configured to provide a signal indicative of a force applied to the seat (e.g., weight of the driver or passenger). The weight sensor may provide a signal proportional to the weight resting on the seat. A presence of the driver may be detected when the weight exceeds a predetermined threshold. In some configurations, the weight sensor may provide a digital signal that is in a first state (high-state) when the weight exceeds a predetermined threshold and in a second state (low-state) when the weight is at or below the predetermined threshold.

The occupancy sensors 110 may include a seat belt sensor that provides a signal indicative of the state of the seat belt. For example, the signal may indicate whether the seat belt is fastened or unfastened. The occupancy sensors 110 may further include a camera system that is configured to determine if a driver and/or passengers are present in the vehicle 100. The controller 120 may process images from the camera to determine the presence or absence of the driver. The controller 120 may communicate with other controllers in the vehicle via a communication network 122.

The vehicle 100 may include a speed sensor 112 configured to output a signal that is indicative of the speed of the vehicle 100. The speed sensor 112 may be one or more wheel speed sensors coupled to one or more of the wheels 104, 106. The speed sensor 112 may be an output shaft speed sensor coupled to an output shaft of the powertrain 102.

The vehicle 100 may include a brake pedal and an associated brake pedal travel sensor 124. The brake pedal may be used by the driver to apply the brakes. The brake pedal may be mechanically coupled to the braking system and/or electronically coupled to the braking system for applying the service brakes. The brake pedal travel sensor 124 may be configured to provide a signal indicative of the position of the brake pedal. For example, the brake pedal travel sensor 124 may be a potentiometer that changes an output voltage as the position of the brake pedal changes. The controller 120 may receive the signal and determine a brake pedal position. From the signal, the controller 120 may determine if the brake pedal is released and/or the amount of travel of the brake pedal when applied.

The vehicle 100 may include an accelerator pedal and an associated accelerator pedal travel sensor 118. The accelerator pedal may be used by the driver to provide a driver demand to control speed and acceleration of the vehicle. The accelerator pedal travel sensor 118 may be configured to provide a signal indicative of a position of the accelerator pedal. For example, the accelerator pedal travel sensor 118 may be a potentiometer that changes an output voltage as the position of the accelerator pedal changes. The controller 120 may receive the signal and determine an accelerator pedal position. From the signal, the controller 120 may determine if the accelerator pedal is released and/or the amount of travel of the accelerator pedal from a rest position. The signal provided by the accelerator pedal travel sensor 118 may be indicative of the driver demand for propulsion.

The vehicle 100 may include a display module 116 configured to display various status and operational information to the vehicle occupants. The display module 116 may include a display screen configured to display textual messages to the occupants. The display module 116 may include lamps or lights to indicate status in a binary format. The display module 116 may include a message and/or lamp that conveys the operational status of the powertrain 102. For example, a powertrain status lamp may illuminate when the powertrain 102 is inhibited from providing torque to the drive wheels 104. The display module 116 may include a message and/or lamp that conveys the status of the EPB 200.

The powertrain control system may determine conditions in which the engine is autostarted and autostopped. For example, the engine may be autostarted when the brake pedal signal indicates that the brake pedal has been released (e.g., returned to a rest position). The engine may be autostarted when the accelerator pedal signal indicates that the accelerator pedal is being pressed. A change in the accelerator pedal position indicates a change in propulsive torque demand from the driver. The engine may be autostopped when the brake signal pedal indicates that the brake pedal is being applied. The engine may be autostopped when the accelerator pedal signal indicates that the accelerator pedal has been released (e.g., returned to a rest position). Engine autostops may also be contingent on a speed of the vehicle meeting certain criteria (e.g., vehicle speed less than a speed threshold). Various other conditions for autostopping and autostarting are possible.

During operation of the vehicle, it is possible that the EPB 200 may be applied during an engine autostop. For example, the driver may manually activate the EPB 200 when the vehicle has come to a stop which includes an engine autostop. As the EPB 200 is holding the vehicle, the driver may release the brake pedal. In a vehicle that is configured to perform an engine autostart when the brake pedal is released, an engine autostart will be initiated. Independent use of the EPB 200 may decrease fuel economy as the engine will be caused to run upon brake release even when the EPB 200 is activated. An improved solution may be to maintain the engine in the autostop condition when EPB 200 is activated and the brake pedal is released.

The controller 120 may be programmed to automatically command application of the EPB 200 when the powertrain 102 is autostopped. The controller 120 may also monitor the speed signal to ensure the vehicle 100 is stopped before commanding activation of the EPB 200. For example, if the speed signal indicates a speed less than a predetermined threshold (e.g., 1 mile/hour), then the vehicle 100 may be in a stopped condition. The engine autostop may be triggered by application of the brake pedal. When the controller 120 detects that the vehicle 100 is stopped, a command may be issued to the EPB controller 220 to apply the EPB 200. In this condition, an engine autostart may be inhibited upon releasing the brake pedal. The engine (e.g., 302, 402) may remain autostopped while the brake pedal is released. Other conditions may then be relied upon for triggering an engine autostart. For example, the controller 120 may monitor for application of the accelerator pedal. If the accelerator pedal position exceeds a threshold, an engine autostart may be initiated. During the engine autostart, the controller 120 may command release of the EPB 200 to allow vehicle movement.

If, during the engine autostop condition, the driver shifts the powertrain 102 into a neutral gear mode, the powertrain 102 may remain in the engine autostop mode. In addition, the controller 120 may continue to command application of the EPB 200 to prevent vehicle movement.

If the driver shifts the powertrain 102 into a reverse gear mode when the brake pedal is released, the powertrain 102 may remain in an engine autostop mode. If the EPB 200 is not applied, the controller 120 may issue a command to activate the EPB 200. If the EPB 200 is already applied, it may continue to be applied. An engine autostart may be initiated when the driver applies the brake pedal. If the powertrain 102 was already in an engine autostart state when the driver shifted to the reverse gear mode, the powertrain 102 may remain in the engine autostart state and the EPB 200 may remain in its previous state.

In a drive mode, an engine autostart may be initiated when the accelerator pedal position exceeds a predetermined engine autostart threshold. The controller 120 may command the EPB 200 to be released when the accelerator pedal position exceeds a predetermined EPB release threshold.

The predetermined engine autostart threshold and the predetermined EPB release threshold are not necessarily at the same level.

The controller 120 may be programmed to monitor for the presence of the driver in the vehicle 100. During an engine autostop, the powertrain 102 may generate less noise than in the engine autostart state as the engine is not running. In addition, if the EPB 200 is applied, a driver may not realize that the powertrain 102 is in a run mode before exiting the vehicle 100. It may be beneficial to detect when the driver leaves the vehicle 100 while the powertrain 102 is in a run mode.

The controller 120 may monitor the status of the occupancy sensors. For example, the seat belt sensors may be monitored to detect the connection status of the driver seat belt. If the driver seat belt state changes to unbuckled, a flag may be set. Under this condition, the powertrain may remain in the engine autostop state and the EPB 200 may continue to be applied. The door sensor may be monitored to detect if the driver door is opened. If the driver door is opened and the driver seat belt is unbuckled, this may indicate that the driver is leaving or has left the vehicle 100. When it is detected that the driver may be leaving the vehicle 100, an engine autostart may be initiated. The EPB 200 may remain applied to prevent vehicle motion. The engine auto start may alert the driver that the vehicle 100 is still in a run state. The engine may remain in the autostart state for a predetermined duration. Upon expiration of the predetermined duration, if the driver still remains out of the vehicle 100 (e.g., door opened and seat belt unbuckled), then an engine autostop may be initiated. If the driver re-enters the vehicle 100 and the driver door is closed before the predetermined duration, an engine autostop may be commanded. In some configurations, if the driver re-enters the vehicle 100 and the driver door is closed before the predetermined duration, the engine autostop may be not be commanded until the vehicle speed is greater than a predetermined speed (e.g., 4 miles/hour).

After the predetermined duration has expired and the powertrain is placed in an engine autostop state and vehicle propulsion is inhibited. Vehicle propulsion may be inhibited until the driver re-starts the vehicle 100 manually. That is, an ignition cycle must be initiated using the key, remote, or keyless entry device. The driver may be required to re-cycle the ignition to start an ignition cycle. If the driver re-enters the vehicle 100 before expiration of the predetermined duration, re-cycling the ignition is not necessary.

Figure 5:
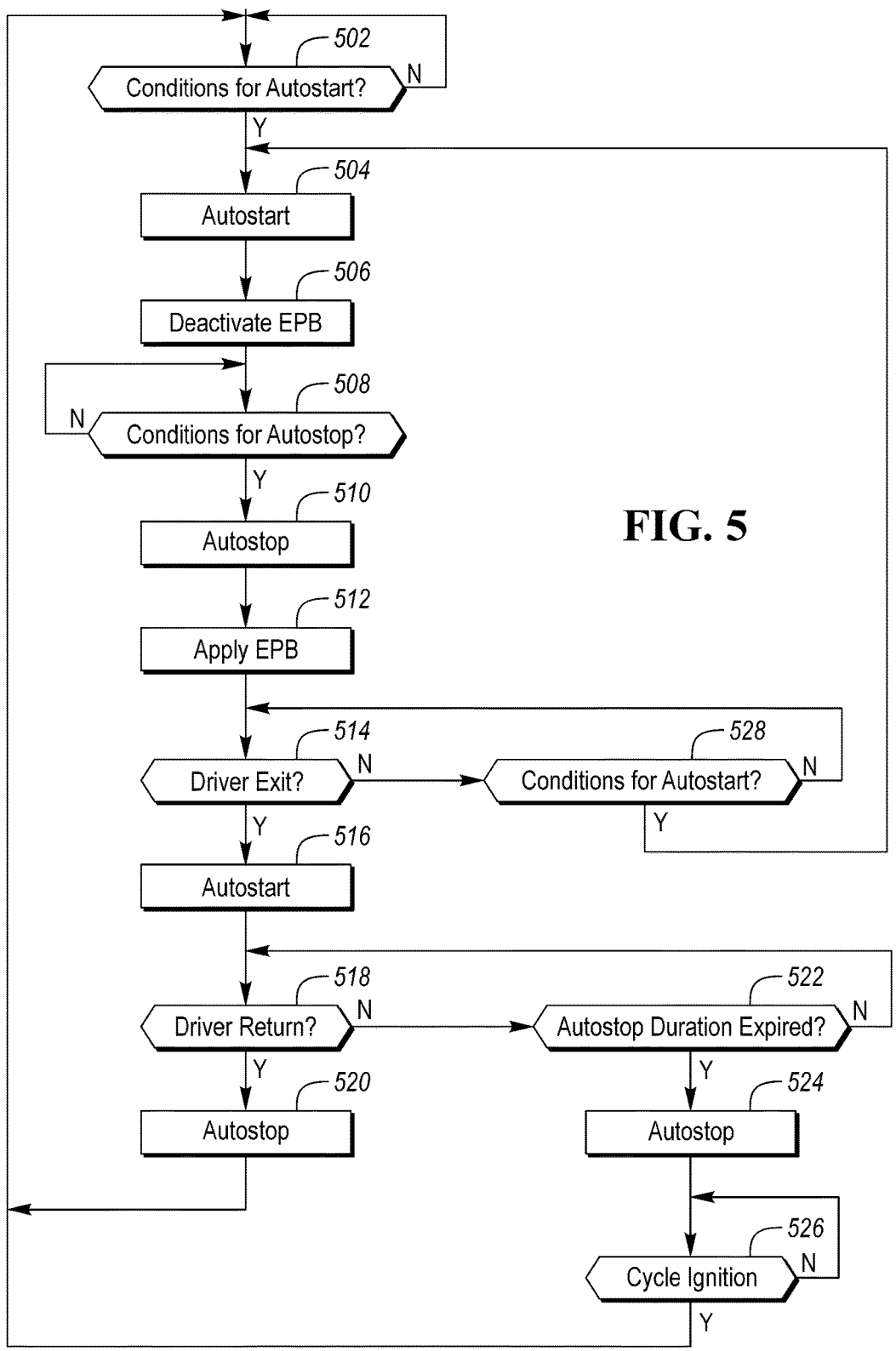
FIG. 5 is a flowchart for a sequence of operations for a powertrain control system in a vehicle with an engine autostart/autostop system and an electric parking brake.

FIG. 5 depicts a flowchart of a possible sequence of operations that may be executed in the controller 120. At operation 502, conditions for autostarting the powertrain 102 may be checked. The conditions may include an accelerator pedal position exceeding a threshold. If the conditions are not satisfied, operation 502 may be repeated. If the conditions for autostarting the powertrain 102 are satisfied, operation 504 may be executed. At operation 504, the powertrain is autostarted. For example, the engine (e.g., 302, 402) is started and the powertrain 102 is placed in a mode that allows the application of propulsive torque to propel the vehicle 100. At operation 506, the controller 120 may command deactivation of the EPB 200.

At operation 508, conditions for autostopping the powertrain 102 may be checked. The conditions may include a brake pedal position exceeding a threshold. If conditions for autostopping the powertrain 102 are not satisfied, operation 508 may be repeated. If the conditions for autostopping the powertrain 102 are satisfied, operation 510 may be performed. At operation 510, the powertrain 102 may be autostopped. For example, the engine (e.g., 302, 402) is commanded to be in a non-running state. At operation 512, the controller 120 may be command activation of the EPB 200. Commanding activation of the EPB 200 may be conditioned on the vehicle speed being less than a predetermined speed.

At operation 514, the controller 120 may monitor the occupancy sensors for conditions indicative of the driver having exited the vehicle 100 or being in the process of exiting the vehicle 100. For example, the occupancy sensors may include a seat belt sensor and a door sensor. The controller 120 may monitor the signals provided by the seat belt sensor and the door sensor. If the seat belt sensor indicates that the driver seat belt is in an unbuckled or unlatched state and the door sensor indicates that the driver door is in an opened state, the driver may have exited the vehicle 100. If the conditions are indicative of the driver having not exited the vehicle 100, operation 528 may be performed. At operation 528 conditions for autostarting the engine are checked and if satisfied execution returns to operation 504 to autostart the engine. If the conditions of autostarting the engine are not satisfied, operation 514 is repeated to check for driver exit.

In other configurations, the weight sensor may be monitored. For example, the weight sensor signal may be monitored, and, if the signal is less than a predetermined threshold, it may be indicative of the driver having exited the vehicle. The weight sensor may be monitored to detect a peak weight to detect entry of the driver. Deviations from the peak weight may indicate that the driver has exited the vehicle. The weight sensor signal may also be monitored for a decrease in weight that is greater than a predetermined decrease. In other configurations, images from a camera may be monitored to detect the absence of the driver. For example, a baseline image may be taken when it is likely that the driver is seated (e.g., seat belt fastened, weight sensor signal greater than a threshold). Subsequent images may be compared to the baseline image to determine if the driver is still present. Note that some or all of the sensors may be used in various combinations to provide a signal indicative of the presence or absence of the driver.

If the conditions indicative of a driver having exited the vehicle 100 are satisfied, operation 516 may be performed. At operation 516, the powertrain 102 may be autostarted. For example, the engine (e.g., 302, 402) may be rotated to a starting speed and provided with fuel and spark. At operation 518, the controller 120 may monitor the occupancy sensors conditions indicative of the driver returning to the vehicle 100. For example, if the door sensor indicates that the driver door is closed and the seat belt sensor indicates that the driver seat belt is fastened, the driver may have returned to the vehicle 100. If the driver has returned to the vehicle 100, operation 520 may be performed. At operation 520, the powertrain 102 may be autostopped and execution may return to operation 502.

If the driver has not returned to the vehicle 100, operation 522 may be performed. At operation 522, the controller 120 may monitor the duration of the autostop starting from detection of the driver exiting the vehicle 100. If the duration of the autostop is less than a predetermined autostop duration, then operation 518 may be performed. If the duration of the autostop is greater than the predetermined autostop duration, then operation 524 may be performed. At operation 524, the powertrain 102 may be autostopped. At operation 526, the controller 120 may monitor for a cycling of the ignition. If a new ignition cycle is initiated by the driver (e.g., recycling the key or pressing start button), operation 502 may be performed. If a new ignition cycle is not initiated, execution may return to operation 526 to continue checking for a cycling of ignition. Vehicle propulsion may not be allowed until the ignition is cycled.

The system described provides benefits by modifying the engine autostarting conditions to include the status of the EPB 200. The conditions permit application of EPB 200 during engine autostops without causing unnecessary engine autostarts. In addition, the driver exit conditions prevent the vehicle from being left in an operational mode during an engine autostop. By performing an engine autostart when the driver exits the vehicle, the driver may be reminded that the powertrain is in an operational condition. This reminder may prevent the driver from leaving the vehicle in an operational state. For example, upon arriving at a parking location, an engine autostop may be performed and the driver could potentially leave the vehicle without cycling the ignition off potentially leaving the vehicle with the keys in the ignition. The engine autostart may cause the driver to realize this condition and properly shut down and secure the vehicle before leaving.

The processes, methods, or algorithms disclosed herein can be deliverable to/implemented by a processing device, controller, or computer, which can include any existing programmable electronic control unit or dedicated electronic control unit. Similarly, the processes, methods, or algorithms can be stored as data and instructions executable by a controller or computer in many forms including, but not limited to, information permanently stored on non-writable storage media such as ROM devices and information alterably stored on writeable storage media such as floppy disks, magnetic tapes, CDs, RAM devices, and other magnetic and optical media. The processes, methods, or algorithms can also be implemented in a software executable object. Alternatively, the processes, methods, or algorithms can be embodied in whole or in part using suitable hardware components, such as Application Specific Integrated Circuits (ASICs), Field-Programmable Gate Arrays (FPGAs), state machines, controllers or other hardware components or devices, or a combination of hardware, software and firmware components.

The processes, methods, or algorithms disclosed herein can be deliverable to/implemented by a processing device, controller, or computer, which can include any existing programmable electronic control unit or dedicated electronic control unit. Similarly, the processes, methods, or algorithms can be stored as data and instructions executable by a controller or computer in many forms including, but not limited to, information permanently stored on non-writable storage media such as ROM devices and information alterably stored on writeable storage media such as floppy disks, magnetic tapes, CDs, RAM devices, and other magnetic and optical media. The processes, methods, or algorithms can also be implemented in a software executable object. Alternatively, the processes, methods, or algorithms can be embodied in whole or in part using suitable hardware components, such as Application Specific Integrated Circuits (ASICs), Field-Programmable Gate Arrays (FPGAs), state machines, controllers or other hardware components or devices, or a combination of hardware, software and firmware components.

While exemplary embodiments are described above, it is not intended that these embodiments describe all possible forms encompassed by the claims. The words used in the specification are words of description rather than limitation, and it is understood that various changes can be made without departing from the spirit and scope of the disclosure. As previously described, the features of various embodiments can be combined to form further embodiments of the invention that may not be explicitly described or illustrated. While various embodiments could have been described as providing advantages or being preferred over other embodiments or prior art implementations with respect to one or more desired characteristics, those of ordinary skill in the art recognize that one or more features or characteristics can be compromised to achieve desired overall system attributes, which depend on the specific application and implementation. These attributes may include, but are not limited to cost, strength, durability, life cycle cost, marketability, appearance, packaging, size, serviceability, weight, manufacturability, ease of assembly, etc. As such, embodiments described as less desirable than other embodiments or prior art implementations with respect to one or more characteristics are not outside the scope of the disclosure and can be desirable for particular applications.

What is claimed is:

1. A vehicle comprising:
   an electric parking brake;
   an engine; and
   a controller programmed to autostop and autostart the engine, activate the electric parking brake responsive to autostopping the engine and vehicle speed being less than a predetermined speed, and responsive to receiving signals indicative of a driver exiting the vehicle during engine autostops, autostart the engine, and after expiration of a predetermined duration, autostop the engine and inhibit vehicle propulsion until initiating an ignition cycle.

2. The vehicle of claim 1, wherein the controller is further programmed to, in response to receiving signals indicative of the driver reentering the vehicle before the predetermined duration is expired, autostop the engine.

3. The vehicle of claim 1 further comprising a seat belt sensor configured to provide a signal indicative of a connection status of a seat belt, and the signal is indicative of a driver exiting the vehicle when the connection status indicates that the seat belt is unlatched.

4. The vehicle of claim 1 further comprising a door sensor configured to provide a signal indicative of a state of a driver door, and the signal is indicative of the driver exiting the vehicle when the signal indicates that the driver door is open.

5. The vehicle of claim 1 further comprising a weight sensor configured to provide a signal indicative of an amount of weight present on a driver seat of the vehicle, and the signal is indicative of the driver exiting the vehicle when the amount of weight decreases by a predetermined amount.

6. The vehicle of claim 1, further comprising a weight sensor configured to provide a signal indicative of an amount of weight present on a driver seat of the vehicle, and the signal is indicative of the driver exiting the vehicle when the amount of weight is less than a predetermined weight.

7. The vehicle of claim 1 further comprising a position sensor for a brake pedal configured to provide a brake pedal travel signal, and wherein the controller is further programmed to, in response to a the brake pedal travel signal becoming less than a predetermined amount that is indicative of the brake pedal being released while the engine is autostopped, maintain activation of the electric park brake.

8. A method of controlling a vehicle comprising:
   autostopping, by a controller, an engine responsive to a brake pedal travel exceeding a predetermined threshold;

activating, by the controller, an electric parking brake responsive to autostopping the engine and a speed of the vehicle being less than a predetermined speed;

autostarting, by the controller, the engine responsive to receiving signals indicative of a driver exiting the vehicle while the engine is autostopped;

autostopping, by the controller, the engine after expiration of a predetermined duration; and inhibiting, by the controller, autostarting the engine until an ignition cycle is initiated.

9. The method of claim 8, wherein signals indicative of the driver exiting the vehicle include a seat belt sensor indicating an unlatched state and a driver door sensor indicating a door opened state.

10. The method of claim 8 further comprising autostopping, by the controller, the engine in response to receiving signals indicative of the driver reentering the vehicle before expiration of the predetermined duration and a speed of the vehicle exceeding a predetermined speed.

11. The method of claim 8 further comprising autostopping, by the controller, the engine in response to receiving signals indicative of the driver reentering the vehicle before expiration of the predetermined duration.

12. A powertrain control system for a vehicle comprising: a controller programmed to (i) autostop and autostart an engine, (ii) command activation of an electric park brake during engine autostops when a speed of the vehicle is less than a predetermined speed, and, (iii) in response to receiving signals indicative of a driver exiting the vehicle while the engine is autostopped, autostart the engine for a predetermined duration.

13. The powertrain control system of claim 12, wherein the controller is further programmed to, in response to receiving signals indicative of the driver reentering the vehicle before the predetermined duration is expired, autostop the engine.

14. The powertrain control system of claim 12, wherein the controller is further programmed to, in response to a driver demand for propulsion exceeding a first predetermined threshold while the engine is autostopped, autostart the engine.

15. The powertrain control system of claim 14, wherein the controller is further programmed to, in response to the driver demand for propulsion exceeding a second predetermined threshold, command deactivation of the electric park brake.

16. The powertrain control system of claim 12, wherein the controller is further programmed to receive a signal indicative of a connection status of a seat belt from a seat belt sensor and the signal is indicative of a driver exiting the vehicle when the connection status indicates that the seat belt is unlatched.

17. The powertrain control system of claim 12, wherein the controller is further programmed to receive a signal from a door sensor indicative of a state of a driver door and the signal is indicative of the driver exiting the vehicle when the signal indicates that the driver door is open.

18. The powertrain control system of claim 12, wherein the controller is further programmed to, in response to expiration of the predetermined duration, autostop the engine and inhibit vehicle propulsion until an ignition cycle is initiated.

\* \* \* \* \*